J. O. MORRISON.
SPEED INDICATOR.
APPLICATION FILED DEC. 28, 1911.

1,058,086.

Patented Apr. 8, 1913.

WITNESSES:
J. H. Gardner.
M. M. Wilkerson.

INVENTOR:
Joseph O. Morrison,
BY
E. T. Silvius,
ATTORNEY.

COLUMBIA PLANOGRAPH CO., WASHINGTON, D. C.

UNITED STATES PATENT OFFICE.

JOSEPH O. MORRISON, OF ANDERSON, INDIANA, ASSIGNOR OF ONE-HALF TO THOMAS S. GETTLE AND GEORGE W. DAVIS, BOTH OF GREENFIELD, INDIANA.

SPEED-INDICATOR.

1,058,086.　　　　Specification of Letters Patent.　　Patented Apr. 8, 1913.

Application filed December 28, 1911. Serial No. 668,325.

*To all whom it may concern:*

Be it known that I, JOSEPH O. MORRISON, a citizen of the United States, residing at Anderson, in the county of Madison and State of Indiana, have invented a new and useful Speed-Indicator, of which the following is a specification, reference being had to the accompanying drawings and to the letters and figures of reference marked thereon.

This invention relates to apparatus for indicating the speed of moving bodies such as wheeled vehicles, machinery or revolving shafts, the invention having reference more particularly to a high speed indicator.

The primary object of the invention is to provide an indicator that shall be so constructed as to be capable of indicating extremely high speeds, and also very low as well as moderate speeds; a particular object of the invention being to provide a speed indicator of improved construction that will be adapted to have a relatively large indicator dial with the graduations thereon arranged on a relatively large scale so as to be quickly and reliably read by the observer.

A still further object is to provide an improved and accurate speed indicator of relatively simple and reliable construction and which will be durable and economical in use.

With the above mentioned and minor objects in view, the invention comprises novel mechanism for translating the revolutions of a rotating shaft into ratios of speed per hour of time and indicating the number of revolutions per hour, or per minute as may be desired on a suitably graduated indicating scale or dial; the invention consisting further in the novel parts and in the combinations and arrangements of parts as hereinafter particularly described and claimed.

Figure 1:
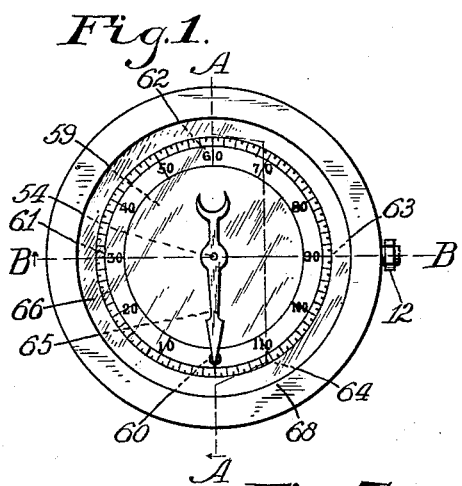
Figure 2:
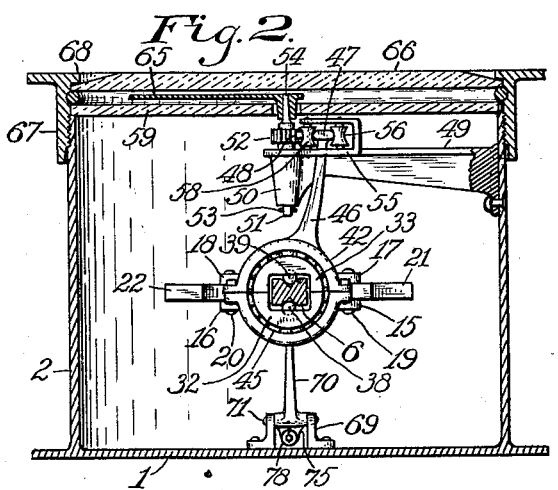
Figure 3:
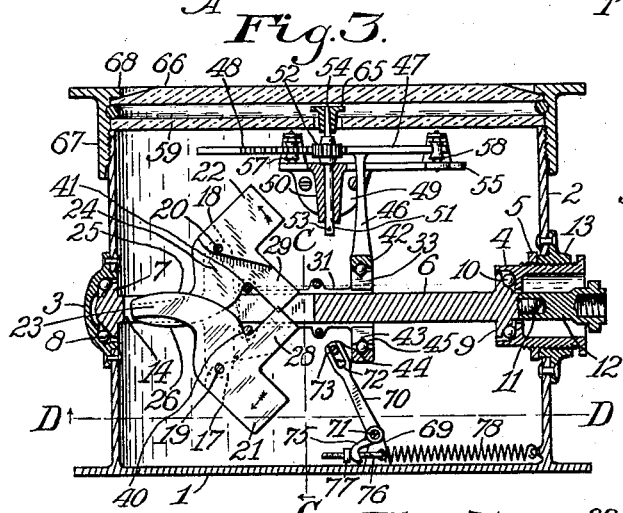
Figure 4:
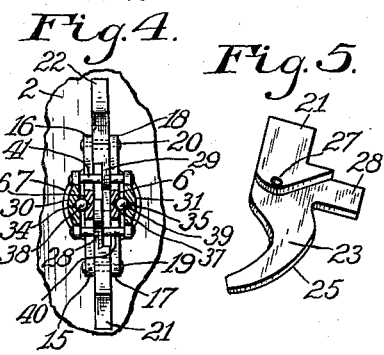
Figure 5:
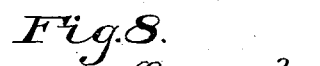
Figures 6, 7:
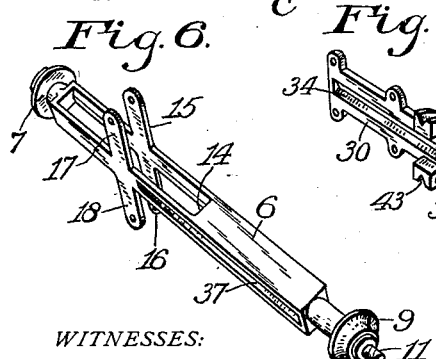
Figure 8:
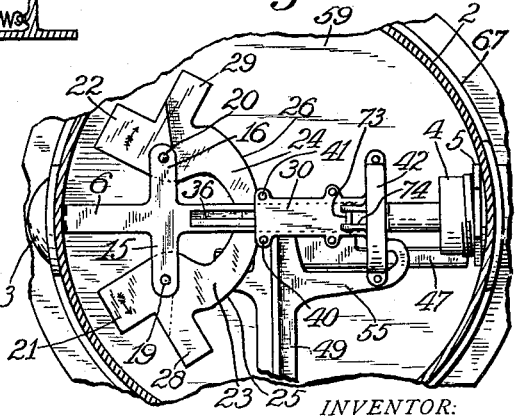

Referring to the drawings, Figure 1 is a front elevation of the improved speed indicator; Fig. 2, a sectional view approximately on the line A A in Fig. 1; Fig. 3, a sectional view approximately on the line B B in Fig. 1 with the mechanism in different position; Fig. 4, a fragmentary section on the line C C in Fig. 3; Fig. 5, a perspective view of one of the parts of the mechanism whereby rotary motion is converted into reciprocatory motion for translating the rotary units into time speed ratios; Fig. 6, a perspective view of the main rotary shaft of the machine; Fig. 7, a perspective view of one of the parts of the mechanism; and Fig. 8, a fragmentary section on the line D D in Fig. 3 with the mechanism in different positions looking upwardly.

Similar reference characters in the different figures of the drawings indicate corresponding elements or features of construction herein referred to.

As preferably constructed the improved indicator includes a casing comprising a back or bottom 1 to which a cylindrical housing shell 2 is connected, one portion of the shell having a suitable journal box 3 secured thereto which preferably is so formed as to constitute a ball cup, the opposite portion of the shell having a suitable journal box 4 connected thereto and preferably it is so formed as to constitute a ball cup adjustably connected with the shell and secured by means of a lock nut 5. A main shaft 6 is rotatably mounted in the journal boxes and as preferably constructed has a cone 7 on one end thereof that is rotatably mounted in the journal box 3 with bearing balls 8 interposed between the cone and the journal box; the opposite end portion of the shaft having a cone 9 thereon that is rotatably mounted in the journal box 4 with bearing balls 10 interposed between the cone and the journal box, the end of the shaft 11 being suitably adapted to have a shaft or a flexible shaft coupler 12 fixedly connected thereto for transmitting motion to the main shaft. Preferably the journal box 4 is screwed into a collar 13 suitably secured in an opening in the shell 2.

The main shaft 6 may be variously constructed in detail and preferably has a longitudinal slot 14 therein at one side of which the shaft has two oppositely extending lateral arms 15 and 16, and at the opposite side of the slot has two similar arms 17 and 18 extending oppositely to the arms 15 and 16 respectively, the arms 15 and 17 having a pivot 19 connected therewith, and the arms 16 and 18 having a pivot 20 connected therewith. The arms may be of any suitable length and may be mere pivoting ears for supporting the two pivots at equal distances from the opposite sides of the axis of the shaft, the distances obviously depending upon the relative proportions of the mechanism. The two pivots are in one and the same plane at right-angles to the axis of the shaft. The shaft is provided with a translator preferably comprising two principal elements adapted to be carried by the pivots about the rotating shaft and to work in harmony, and especially adapted to effect a wide range of movement of an indicator pointer, the weight of the elements being in balance on the shaft and as preferably constructed they comprise respectively two arms or levers mounted between their ends on the pivots 19 and 20, end portions 21 and 22 of the arms respectively normally extending when at rest at oblique angles to the plane in which the pivots are carried by the rotating shaft; said end portions being of sufficient size to constitute weights to be influenced by centrifugal force. The opposite end portions 23 and 24 of the arms respectively preferably are curved and tapering and essentially have curved or parabolic working faces 25 and 26 respectively that are eccentric to the supporting pivots of the arms or to the hole 27 with which each arm is provided to receive the pivot. In rest position the curved end portions extend beyond the opposite side of the plane of the two pivots with the working faces presented toward the pivot of the companion arm. The degree of curvature of the working faces and the degree of eccentricity are determined so as to accord with proportions of various parts of the mechanism and the indicating scope of the indicator dial. The weight portions of the arms are heavier than the curved end portions so that when the shaft rotates, the weight portions, being influenced by centrifugal force, move outward so as to cause the curved portions of the arms to swing substantially to the plane of the two pivots, and in order to carry the curved portions beyond the opposite side of said plane so that the working faces will have wide range of action, the arms are provided with lateral weight extensions 28 and 29 respectively that project from the sides of the arms that have the curved working faces thereon. The extensions when influenced by centrifugal force are forced outward from the shaft and toward the plane of the pivots so that the main weight portions 21 and 22 are carried beyond said plane, and therefore the curved end portions are carried beyond the opposite side of said plane, and the centrifugal force tends to force the curved end portions around the pivots of the arms and outwardly from the shaft, thus counteracting the tendency of the main weight portions 21 and 22 to remain near or return to the plane of the pivots, the effect of the construction being to supplement the weight of the extensions 28 and 29 by the weight of the curved end portions of the arms, for augmenting the range of movement of the arms during relatively high speed of the shaft.

Suitable transmission apparatus is provided and adapted to be actuated by means of the working faces 25 and 26 of the translator elements, and preferably includes a sleeve mounted to freely slide longitudinally along the shaft 6, the sleeve preferably being composed of two counterpart sections 30 and 31 provided at one end with semi-circular cylinder sections 32 and 33 respectively that together constitute a cylindrical-head, the sections preferably having ball races 34 and 35 in the inner sides thereof opposite the shaft, the latter having oppositely arranged ball races 36 and 37 therein, and bearing balls 38 and 39 are placed in the ball races at opposite sides of the shaft so that the sleeve may move longitudinally and be rotated by the shaft. The sleeve is provided with one or more, preferably two contact devices, preferably rollers 40 and 41 at opposite sides of the shaft and in contact with the working faces 25 and 26 respectively to be moved thereby away from the plane of the pivots 19 and 20, the arrangement being such that the curved end portions of the arms operate side by side in the slot 14, the extensions 28 and 29 when at rest extending also into the slot. The periphery of the cylindrical-head of the sleeve is concentric to the axis of the shaft 6 and is rotatable in a strap 42 which is suitably mounted on the head preferably by means of antifrictional bearings, the periphery of the head preferably having a V-shaped groove 43 therein, the strap having a corresponding groove 44 in the inner side thereof, and bearing balls 45 are placed in the grooves. The strap has an arm 46 thereon to which a rack-bar 47 is fixedly connected so as to extend parallel to the shaft 6, the rack-bar having gear teeth 48 on one side thereof.

A suitable arm or bracket 49 is secured to the inner side of the shell 2 and supports a journal box 50 in the axis of the shell. A shaft 51 is rotatably mounted in the journal box and has a pinion 52 thereon, the shaft preferably being retained in the journal box by a pin 53, said shaft having a tapering end portion 54. The bracket 49 is provided with a suitable extension 55 on which rollers 56 and 57 are mounted that guide the rack-bar 47 in contact with the pinion 52, other rollers 58 being mounted at the opposite side of the rack-bar for guiding it. When the sleeve on the shaft moves longitudinally while rotating in the strap 42 it is evident that the rack-bar also is moved longitudinally and rotates the pinion 52.

A suitably graduated dial 59 is placed on the open end of the shell 2 and has a circular scale on its outer face which has a zero mark 60 thereon, and such other marks as may be desired, such as "30" at 61, "60" at 62, "90" at 63, "110" at 64, other suitable intermediate indicating members being placed on the dial at graduating marks as may be desired. The end portion 54 of the shaft 51 extends through the middle portion of the dial and has a pointer 65 removably secured thereto, the end of the pointer when at rest being at the zero mark 60. A transparent plate 66 preferably composed of glass is suitably supported a short distance from the dial and beyond the pointer, and is retained by means of a bezel comprising a band 67 screwed onto the shell 2 and a lip 68 engaging the edge portion of the plate 66.

The translator in operation moves the sleeve on the shaft 6 in one direction only, and in order to move the sleeve in the opposite direction and contract the translator while the shaft speed lessens and while at rest, a bracket 69 is fixedly supported on the inner side of the back or bottom 1 and supports an arm 70 by means of a pivot 71, the arm being relatively long and having a slot 72 in its end portion and receiving a pivot pin 73 that is carried by ears 74 fixed on the strap 42. The arm 70 has a relatively short finger 75 thereon with which an adjusting screw 76 provided with an adjusting nut 77 is connected, a relatively long coil-spring 78 being connected to the adjusting screw and also to the shell 2 for yieldingly forcing the sleeve toward the plane of the pivots 19 and 20.

It should be understood that the transmission apparatus between the translator and the indicating pointer may be variously modified in construction as may be preferred, and it will be understood also that the dial may be variously marked to suit requirements either for indicating the number of revolutions per minute of the shaft 6 or machinery connected therewith, the dial in the present case being designed for indicating the speed of travel of a vehicle on the road in miles per hour, and obviously the diameter of the vehicle wheel that actuates the shaft 6 is taken into account when graduating the scale on the indicator dial.

In practical use while the shaft 6 rotates, the weight portions 21 and 22 of the arms are forced outwardly from the shaft so as to move the sleeve along the shaft as hereinbefore explained, resulting in the pointer 65 being moved over the dial, and if directed to the mark 61 indicates a speed of 30 miles per hour, the pointer having a wide range of movement so that minute graduations are permissible on a sufficiently large scale to be easily distinguished. As the speed lessens it is evident that the spring 78 retracts the sleeve on the shaft and contracts the translator, the translator automatically expanding with each increase in the speed.

Other results and advantages of the operation of the improved indicator will be readily understood from the description of construction and function of the various parts thereof.

Having thus described the invention, what is claimed as new is—

1. A speed indicator including a supported dial, a movably supported pointer, a rotary shaft, a weighted arm pivotally mounted on the shaft and provided with a laterally extending supplemental augmenting and counteracting weight, and connections between the arm and the pointer.

2. A speed indicator including a supported dial, a pointer supported to move over the dial, a rotatably supported shaft, two arms pivotally connected between their ends to the shaft, one side of one end portion of each arm having a curved working face, the opposite end portion of each arm having a projection on the side that has the working face and extending when at rest toward the axis of the shaft, a sleeve slidingly mounted on the shaft and having two contact devices in contact with the working faces of the arms respectively, and transmission apparatus connecting the pointer with the sleeve.

3. A speed indicator including a supported dial, a pointer supported to move over the dial, a rotatably supported shaft having a slot therein, two arms pivotally connected between their ends to the shaft, one end portion of each arm extending into the slot and having a curved working face, a sleeve slidingly mounted on the shaft and having two contact devices in contact with the working faces of the two arms respectively, transmission apparatus connecting the pointer with the sleeve, and means supported independently of the shaft for forcing the sleeve toward the arms with substantially constant pressure.

4. A speed indicator including a supported dial, a pointer supported to move over the dial, a rotatably supported shaft having a slot therein, the shaft having also ears on opposite sides thereof, two arms pivotally connected between their ends to the ears, one end portion of each arm having a curved working face and extending into the slot, a sleeve slidingly mounted on the shaft and having two contact devices in contact with the working faces of the two arms respectively, a strap carried by the sleeve and in which the sleeve may rotate, the strap having an arm thereon, guides for the arm, and transmission apparatus connecting the pointer with the arm of the strap.

5. A speed indicator including a supported dial, a pointer supported to move over the dial, a rotatably supported shaft, two arms pivotally supported between their ends on the shaft, one end portion of each arm having a curved working face, the opposite end portion of the arm being relatively shorter and thicker than the other end portion and having a lateral projection thereon, a sleeve movable longitudinally on the shaft and having a cylindrical portion, a strap rotatable on the cylindrical portion having an arm thereon, a rack-bar connected to the arm of the strap, a guide for the rack-bar, connections between the rack-bar and the pointer, and means for constantly maintaining the sleeve in contact with the two arms.

6. A speed indicator including a housing, a dial on the housing, a pointer supported in the housing to move over the dial, a shaft rotatably mounted in the housing, two arms pivotally connected between their ends to the shaft and having each a curved working face on one end portion thereof, a sleeve movable longitudinally on the shaft and having a cylindrical portion, a strap rotatable on the cylindrical portion and having an arm and a pivot thereon, a guide for the arm, connections between the arm and pointer, a retracting arm pivoted near one end thereof and connected at its opposite end to the pivot of the strap, and a spring anchored to the housing and connected with the retracting arm in proximity to the pivoted portion thereof.

7. In a speed indicator, the combination with a dial, and a pointer mounted to move over the dial, of a shaft rotatably supported and having two pivots on opposite sides thereof, two translating elements respectively mounted on the pivots, each one of said elements having a curved working face and also a lateral extension on one side thereof, each element being weighted beyond the pivot from the portion that has the working face, a sleeve slidingly mounted on the shaft and having contact devices in contact with said working faces, and transmission apparatus connecting the pointer with the sleeve.

8. In a speed indicator, the combination with a rotatable shaft, a sleeve movable longitudinally on the shaft, a dial, and a pointer operatively connected with the sleeve and movable over the dial, of a plurality of arms pivotally connected to the shaft and having each a curved working face that is eccentric to the pivot of the arm, the working face of each arm when the shaft is at rest being presented toward the pivot of the opposite arm and in contact with the sleeve for moving the sleeve in one direction, the arms being movable pivotally under the influence of centrifugal force, and a spring for moving the sleeve in the opposite direction and retracting the arms.

9. In a speed indicator, the combination of a rotatably supported shaft having a slot therein, two arms pivotally mounted on opposite sides of the shaft and extending into the slot obliquely to the shaft when at rest, the outer portions of the arms beyond the pivots thereof being heavier than the inner end portions of the arms, a sleeve movable longitudinally on the shaft and having a cylindrical portion, a strap rotatively mounted on said cylindrical portion and having an arm thereon, a rack-bar connected to the arm, a guide for the rack-bar, a rotatable pointer-shaft having a pinion thereon in contact with the rack-bar, a pointer on the pointer-shaft, and a spring for constantly maintaining the sleeve in contact with the two arms.

In testimony whereof, I affix my signature in presence of two witnesses.

JOSEPH O. MORRISON.

Witnesses:
 THOMPSON G. NEELEY,
 BYRON McMAHAN.

Copies of this patent may be obtained for five cents each, by addressing the "Commissioner of Patents, Washington, D. C."